Dec. 4, 1956  J. PICKLES  2,772,877
POWER-OPERATED MECHANISM FOR VEHICLE BODY VENTILATOR WINDOWS
Filed Oct. 18, 1954  2 Sheets-Sheet 1

INVENTOR.
JOSEPH PICKLES
BY *Whittemore,*
*Hulbert & Belknap*
ATTORNEYS

Dec. 4, 1956     J. PICKLES     2,772,877
POWER OPERATED MECHANISM FOR VEHICLE BODY VENTILATOR WINDOWS
Filed Oct. 18, 1954     2 Sheets-Sheet 2
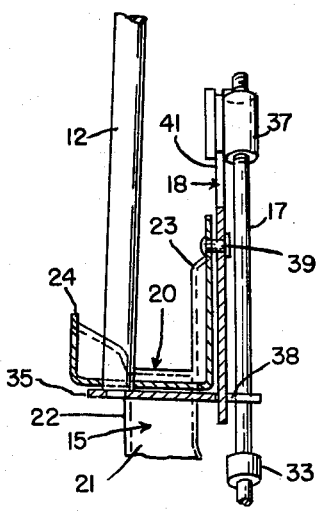
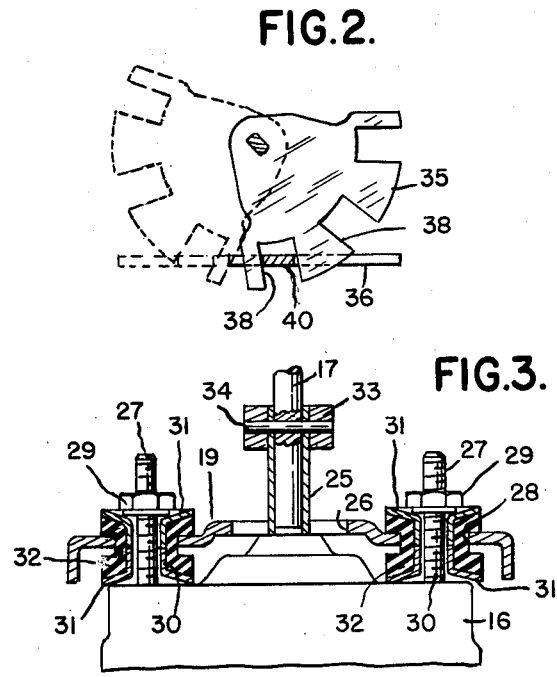
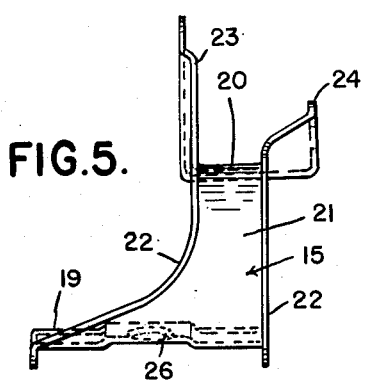
INVENTOR.
JOSEPH PICKLES
BY
ATTORNEYS

United States Patent Office 2,772,877
Patented Dec. 4, 1956

2,772,877

POWER OPERATED MECHANISM FOR VEHICLE BODY VENTILATOR WINDOWS

Joseph Pickles, Dearborn, Mich., assignor to Ferro Stamping Company, Detroit, Mich., a corporation of Michigan Application October 18, 1954, Serial No. 462,821

7 Claims. (Cl. 268—120)

This invention relates generally to window regulators and refers more particularly to an improved regulator capable of being installed on vehicle bodies for swinging a ventilator window panel about an upwardly directed axis.

It is an object of this invention to provide a regulator mechanism composed of a relatively few simple parts capable of being installed in a compact space and rendering it commercially practical to operate a vehicle body ventilator panel of the swinging type by power means, if desired.

The foregoing as well as other objects will be made more apparent as this description proceeds especially when considered in connection with the accompanying drawings, wherein:

Figure 2 is a cross sectional view taken on the line 2—2 of Figure 1;

Figure 3 is a sectional view taken on the line 3—3 of Figure 1;

Figure 4 is a sectional view taken on the line 4—4 of Figure 1; and

Figure 5 is a side elevational view of the mounting bracket for the regulator mechanism.

Figure 1:
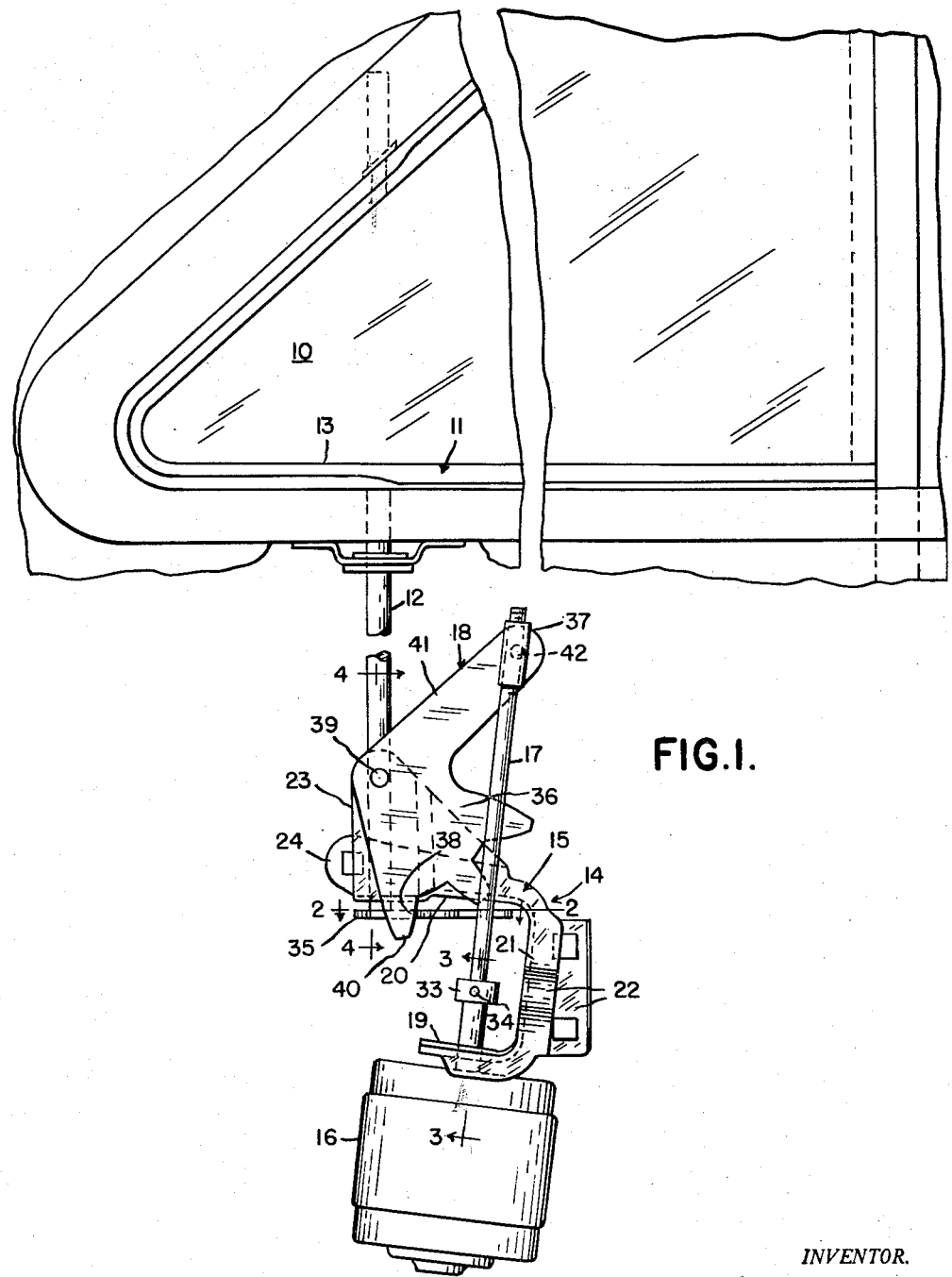
Figure 1 is a semi-diagrammatic side elevational view of a vehicle body ventilator window having regulator mechanism embodying the features of this invention.

In Figure 1 of the drawings, the numeral 10 designates a ventilator window panel of the general type installed on vehicle bodies for swinging movement about an upwardly extending axis. In accordance with conventional practice, the ventilator panel 10 comprises a frame 11 and a pivot shaft 12 rotatably supported in any suitable manner on the body structure with its axis extending substantially vertically. As is usually the case in installations of the above type, the upper end of the pivot shaft 12 is fixed to the bottom bar 13 of the frame 11 and the lower end extends downwardly to a position between the inner and outer panels (not shown) of the vehicle body structure.

In the present instance the pivot shaft 12 is rotated in opposite directions to swing the ventilator panel 10 in corresponding directions by regulator mechanism indicated generally in Figure 1 of the drawings by the numeral 14. The regulator mechanism 14 comprises a mounting bracket 15, an electric motor 16, a drive shaft 17 coupled to the electric motor 16, and an operative connection 18 between the drive shaft 17 and pivot shaft 12.

The mounting bracket 15 has a base section 19, a top section 20 spaced above the base section 19 in substantial parallel relation thereto, and an upright wall 21 connecting the rear end of the base section 19 to the corresponding end of the top section 20. The upright wall 21 is formed with rearwardly projecting reinforcing flanges 22 at opposite side edges thereof and one of the flanges is of greater width than the other to provide an attaching flange enabling the bracket to be rigidly secured to an adjacent part of the body structure. The top section 20 is also fashioned with flanges 23 and 24 which respectively project upwardly from opposite edges of the top section 20. The flange 24 serves as an attaching flange and is apertured to receive a fastener element for assisting in securing the bracket to the adjacent body structure.

The electric motor 16 has a tubular operating shaft 25 and is supported by the base section 19 of the bracket 15. The axis of the operating shaft 25 is shown as extending upwardly in the general direction of the pivot shaft 12. However, the parts may be designed so that the motor shaft may extend in any desired direction. As shown in Figure 3 of the drawings, the electric motor 16 is positioned below the base section 19 of the bracket 15 and the motor operating shaft 25 projects upwardly through an enlarged clearance opening 26 formed in the base section 19. The electric motor 16 is fastened to the bracket 15 by a pair of studs 27 having the lower ends secured to the upper end of the motor casing at diametrically opposite sides of the shaft 25. The studs 27 project upwardly through enlarged apertures 28 formed in the base 19 of the bracket 15 and clamping nuts 29 are respectively threadably mounted on the upper ends of the studs 27. Spacers in the form of sleeves 30 are respectively mounted on the studs 27 between the clamping nuts 29 and the upper end of the motor 16. The sleeves 30 have radially outwardly extending flanges 31 at opposite ends of a diameter greater than the diameter of the openings 28 and respectively engageable by the clamping nuts 29 and the upper end of the motor 16. In the present instance, each sleeve 30 is formed of two sections to facilitate assembly. In any case, the sleeves 30 not only provide spacers between the clamping nuts 29 and the upper end of the motor casing 16 but in addition serve as retainers for grommets 32 formed of a resilient material such for example as rubber. The grommets 32 extend through the openings 28 and have radially outwardly extending flanges at opposite ends which overlie opposite sides of the base section 19 of the bracket 15 and are respectively engaged by the flanges 31 on the sleeves 30. The arrangement is such that the motor 16 is not only securely mounted on the bracket 15 but is also capable of the required rocking movement relative to the bracket 15.

The drive shaft 17 is aligned with the tubular motor shaft 25 and the lower end of the drive shaft telescopes within the motor shaft 25. Referring again to Figure 3 of the drawings, it will be noted that a stop collar 33 is mounted on the upper end of the shaft 25 and this collar together with the drive shaft 17 is secured to the motor shaft 25 by a pin 34. Thus, the drive shaft 17 is rotated by the motor shaft and is free to rock with the motor 16 relative to the bracket 15.

The operative connection 18 between the drive shaft 17 and the pivot shaft 12 comprises a gear sector or segment 35 secured to the lower end of the pivot shaft 12, a cooperating gear sector or segment 36 rotatably supported by the bracket 15, and a nut 37 threadably mounted on the upper end of the drive shaft 17. Nut 37 is desirably formed essentially of a nylon resin or plastic. The gear segment 35 is in the form of a disc having circumferentially spaced notches 38 at the periphery and is rotatable as a unit with the pivot shaft 12 about the axis of the latter.

The cooperating gear segment 36 is supported by a pin 39 on the upright flange 23 of the bracket 15 for rotation about an axis perpendicular to the axis of the pivot shaft 12 and lying in the same vertical plane as the latter axis. The peripheral portion of the gear segment 36 is fashioned with teeth 40 arranged to successively engage the notches 38 of the gear segment 35. Thus, rotation of the gear segment 36 in opposite directions about the axis of the pin 39 imparts a corresponding rotation to the pivot shaft 12 through the medium of the gear segment 35.

The gear segment 36 has an upwardly projecting arm 41 and the extremity of this arm is pivoted to the nut 37 by a pin 42 having its axis extending parallel to the axis of the pin 39. As stated above, the nut 37 is threadedly mounted on the drive shaft 17 so that rotation of the shaft 17 in one direction imparts a movement of the nut 37 downwardly along the drive shaft 17 and rotation of the drive shaft in the opposite direction imparts a movement to the nut 37 in an upward direction along the shaft 17. Inasmuch as the nut 37 is pivoted to the gear segment 36 it follows that the linear travel of the nut is transmitted in the form of a rotative movement to the pivot shaft 12. In practice, the helix angle of the cooperating threads on the drive shaft 17 and nut 37 is predetermined to afford irreversible action. In other words, the arrangement is such that rotation of the shaft 17 by endwise thrusts applied to the nut 37 is prevented and, hence, unauthorized opening of the ventilator panel is likewise prevented. It will also be noted that rocking motion in a substantially vertical plane lying between the adjacent body panels is applied to the drive shaft 17 during rectilinear movement of the nut 37 due to the arc through which the arm 41 swings and this rocking motion is permitted by the resilient mounting of the motor 16 on the bracket 15. The arm 41 of the gear segment 36 constitutes a bell crank therewith and the arm 41 may thus extend in any direction without affecting the operation so long as the motor and the drive shaft 17 are properly connected thereto.

The drawings and the foregoing specification constitute a description of the improved power operated mechanism for vehicle body ventilator windows in such full, clear, concise and exact terms as to enable any person skilled in the art to practice the invention, the scope of which is indicated by the appended claims.

What I claim as my invention is:

1. A power operated ventilator window assembly comprising a pivot shaft supported for rotation about a substantially vertical axis, a ventilator fixed to said pivot shaft and movable by said shaft about its axis, a first toothed sector fixed to said pivot shaft and occupying a plane perpendicular thereto, a mounting bracket, an electric motor having a drive shaft, a threaded shaft coupled to said drive shaft, means mounting said motor, drive shaft, and threaded shaft on said bracket for limited rocking movement with respect thereto in a plane containing said drive shaft and threaded shaft which plane is substantially parallel to the axis of said pivot shaft, a nut on said threaded shaft, a second toothed sector pivotally mounted on said bracket for rocking movement about an axis perpendicular to and intersecting the axis of said pivot shaft, the teeth of said sectors being meshed, and an operating arm on said second sector pivotally secured to said nut.

2. An assembly as defined in claim 1 in which said threaded shaft is generally upright.

3. Power operating mechanism for an automobile ventilator panel adapted to be housed in the restricted space below the panel between inner and outer body panels, said mechanism comprising a generally vertical pivot shaft fixed to the ventilator panel for swinging the same, a first toothed sector fixed to the lower end of said pivot shaft, a generally U-shaped mounting bracket having generally horizontal vertically spaced legs and a generally vertical web connecting the adjacent ends of said legs, a motor having an upwardly extending drive shaft secured to the lower leg of said bracket for limited rocking movement, a threaded shaft connected to said drive shaft, a flange extending upwardly from the upper leg of said bracket, a second toothed sector pivoted to said flange with its pivot axis perpendicular to and intersecting the axis of said pivot shaft, a nut on said threaded shaft, and an operating arm on said second sector pivotally connected to said nut.

4. An assembly as defined in claim 3, said bracket having mounting flanges at one side thereof extending along said web and one of said legs.

5. An assembly as defined in claim 3, the lower end of said pivot shaft extending through an opening in the upper leg of said bracket and said first sector being disposed between said bracket legs.

6. Power operating mechanism for an automobile ventilator panel adapted to be housed in the restricted space below the panel between inner and outer body panels, said mechanism comprising a generally vertical pivot shaft fixed to the ventilator panel for swinging the same, a first toothed sector fixed to the lower end of said pivot shaft, a second toothed sector meshed with said first sector and mounted for rocking movement about an axis perpendicular to and intersecting the axis of said pivot shaft and generally perpendicular to the adjacent body panels, an electric motor mounted for limited rocking movement in a vertical plane lying between the adjacent body panels, a threaded shaft connected to said motor, a nut on said threaded shaft, and a rigid arm on said second sector pivotally coupled to said nut.

7. An assembly as defined in claim 6 in which said nut is formed essentially of a nylon plastic and has an irreversible connection with said threaded shaft.

References Cited in the file of this patent

UNITED STATES PATENTS

| | | |
|---|---|---|
| 2,174,599 | Rhein | Oct. 3, 1939 |
| 2,178,753 | Greif | Nov. 7, 1939 |
| 2,679,392 | Brundage | May 25, 1954 |